United States Patent [19]
Higashiyama et al.

[11] 3,766,022
[45] Oct. 16, 1973

[54] METHOD FOR MEASURING AN ACTIVITY OF CHROMIUM(III) IONS

[75] Inventors: Kenji Higashiyama; Hiroshi Hirata, both of Osaka, Japan

[73] Assignee: Matsushita Electric Industrial Co., Ltd., Kadoma, Osaka, Japan

[22] Filed: Feb. 28, 1972

[21] Appl. No.: 229,910

[52] U.S. Cl. .............................. 204/1 T, 204/195 M
[51] Int. Cl.. G01n 27/30, G01n 27/26, G01n 27/46
[58] Field of Search .................. 204/195 M, 1 T; 324/29

[56] References Cited
UNITED STATES PATENTS

| | | | |
|---|---|---|---|
| 3,591,464 | 7/1971 | Frant et al. | 204/1 T |
| 3,669,862 | 6/1972 | Hirata et al. | 204/195 M |
| 3,672,962 | 6/1972 | Frant et al. | 204/1 T |

Primary Examiner—G. L. Kaplan
Attorney—E. F. Wenderoth et al.

[57] ABSTRACT

A method for measuring an activity of chromium(III) ions comprises a selective electrode and a reference electrode immersed in a solution containing chromium(III) ions, said selective electrode including a disc in a batch composition which comprises a combination of nickel chalcogenide and at least one member selected from the group consisting of silver selenide and silver telluride or in a batch composition which comprises a combination of silver sulfide and at least one member selected from the group consisting of nickel selenide and nickel telluride.

6 Claims, 2 Drawing Figures

3,766,022

METHOD FOR MEASURING AN ACTIVITY OF CHROMIUM(III) IONS

BACKGROUND OF THE INVENTION

The invention relates to a method for measuring an activity of chromium(III) ions and more particularly to a method comprising a selective electrode responsive to the activity of chromium(III) ions and a reference electrode.

Chromium(III) ion activity can be determined by several methods such as chelatometric titration, spectrophotography and polarography. However, these methods generally require troublesome pretreatment for the sample before the measurement of Chromium-(III) ions.

It is desirable for chemical industry to have a method for measuring the activity of chromium(III) ions in a solution without any troublesome pretreatment similar to that of a pH glass electrode for measuring the pH value of a solution without any pretreatment of the solution to be tested.

An object of this invention is to provide a method for measuring directly the activity of chromium(III) ions in a solution.

A further object of this invention is to provide such a measuring method characterized by a high sensitivity to chromium(III) ions.

Another object of this invention is to provide a chromium(III) ion measuring method characterized by a high response to the chromium(III) ions.

These and other objects of this invention will be apparent upon consideration if the following detailed description taken together with accompanying drawings.

A device for measuring an activity of chromium(III) ions according to the present invention comprises a selective electrode and a reference electrode immersed in a solution containing chromium(III) ions, whereby only another surface contacts with said solution. Said chromium(III) ion-selective electrode includes a disc which is in a batch composition comprising a combination of nickel chalcogenide and at least one member selected from the group consisting of silver telluride and silver selenide, or in a batch composition comprising a combination of silver sulfide and at least one member selected from the group consisting of nickel telluride and nickel selenide. Said batch composition according to the present invention achieves a chromium(III) ion-selective electrode having a high sensitivity and a wide application range with pH value in a solution to be tested.

Figure 1:
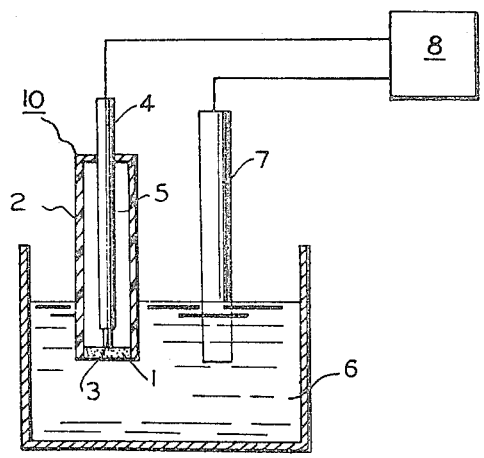
FIG. 1 is a schematic diagram of a device for measuring chromium(III) ions in a solution in accordance with the invention.

Referring to FIG. 1, reference character 10 designates, as a whole, a selective electrode which comprises a disc in a batch composition according to the present invention. Said lead 3 is enveloped by a sealed wire 4. A combination of said disc 1 and said lead 3 partly enveloped by said sealed wire 4 is enclosed in a housing 2 so that another surface of said disc 1 contacts with a solution 6. Said housing 2 is filled with an insulating resinous materials 5. A reference electrode 7 partly immersed in said solution 6 is electrically connected to one terminal of a voltmeter 8 having a high impedance. Said lead 3 is electrically connected to another terminal of said voltmeter 8.

A variation in the logarithm of the activity of chromium(III) ions in said solution 6 has a substantially linear relation to the variation in the potential between said selective electrode 10 and said reference electrode 7, both being partly immersed in said solution 6. One can use any available and suitable electrode such as a saturated calomel electrode or a silver-silver chloride electrode as said reference electrode 7.

Said disc 1 is in a batch composition comprising a combination of 5–60 wt percent of nickel chalcogenide and 40–95 wt percent of at least one member selected from the group consisting of silver telluride and silver selenide, or in a batch composition comprising a combination of 40–95 wt percent of silver sulfide and 5–60 wt percent of at least one member selected from the group consisting of nickel telluride and nickel selenide in accordance with the invention.

A batch composition comprising a combination of more than 60 wt percent of nickel chalcogenide and less than 40 wt percent of silver chalcogenide results in a low sensitivity of resultant electrode.

A batch composition comprising a combination of less than 5 wt percent of nickel chalcogenide and more than 95 wt percent of silver chalcogenide results in a low sensitivity and a long response time of resultant electrode.

Nickel chalcogenide referred to herein is defined as nickel sulfide, nickel selenide and nickel telluride.

A batch composition referred to herein is defined as a composition of starting materials before heating.

A better result is obtained by using a batch composition wherein said silver sulfide includes at least one member selected from the group consisting of silver selenide and silver telluride, the weight ratio of said silver sulfide to said one member being in a range from one to 10. This batch composition results in a high sensitivity and a short response time of resultant electrode.

Figure 2:
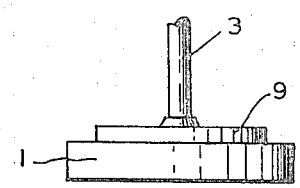
FIG. 2 is a cross sectional view of a disc for use in the device of FIG. 1.

A longer operation life can be obtained by providing said disc with a noble metal electrode such as gold, paradium or platinum electrode. Referring to FIG. 2, disc 1 has a noble metal electrode 9 applied to one surface thereof. A lead 3 is electrically connected to said noble metal electrode 9 by any available and suitable method such as soldering. Said noble metal electrode 9 can be prepared by, for example, vacuum-depositing of a noble metal film or by applying a available commercially noble metal paint.

The disc for use in said selective electrode can be obtained by heating a pressed body of a mixture of a given batch composition in accordance with a conventional ceramic method.

A mixture of starting meterials of a fine powder form in a given batch composition according to the present invention is mixed well in a dry method by any suitable and available equipment and is pressed into a disc in a desired form at a pressure of 100 to 20,000 kg/cm². The pressed disc is heated at a temperature of 100° to 600° C for time period of 1 to 10 hours preferably in a non-oxidizing atmosphere, such as nitrogen or argon.

The method according to the invention can be reliably used at temperatures from 0° to 95° C. The measured potential versus the logarithm of the activity of chromium(III) ions is substantially linear relation.

Many kinds of diverse ions such as sodium, potassium, calcium, magnesium, cadmium, cobalt, aluminum, zinc, chloride, sulfate and perchlorate ions are tolerated and may coexist during the measurement of the activity of the chromium(III) ions. However, cupric, cupric, nickel, lead, ferric, silver, mercuric, iodide and sulfide ions should be removed from the solution to be measured.

Example 1

A mixture of 25 wt percent of nickel telluride and 75 wt percent of silver sulfide is mixed well in a dry method and is pressed at a pressure of 10,000~20,000 kg/cm$^2$ into a disc 15 mm diameter and having a 3 mm thickness. The pressed disc is heated at 400° C for 2 hours in purified nitrogen has stream having a flow rate of 0.2 l/min. The sintered disc is polished, at both surfaces, with silicon carbide abrasive and then with diamond paste into a thickness of 2 mm. The polished disc is provided, at one surface, with a gold electrode which is obtained from Dupont gold paint No. 8115. The polished disc is connected, at the gold electrode, to a lead partly enveloped by a sealed wire and is mounted in a housing of polyvinyl chloride resin. The housing is filled with epoxy resin so as to build a selective electrode as shown in FIG. 1. A combination of the selective electrode and a saturated calomel electrode as a reference electrode is immersed in an aqueous solution of pure chromium(III) nitrate at 25° C. The potential between the selective electrode and the calomel electrode is measured by a voltmeter for use in a pH meter.

The method measures the activity of chromium(III) ions with a high sensitivity as shown in Table 1.

TABLE 1

| Activity of chromium(III) ions, M | Potential mV |
|---|---|
| $10^{-1}$ | −51 |
| $10^{-2}$ | −71 |
| $10^{-3}$ | −91 |
| $10^{-4}$ | −111 |
| $10^{-5}$ | −130 |
| $10^{-6}$ | −148 |

Example 2

The device for measuring the activity of chromium(III) ions is prepared in a manner similar to that of Example 1. A disc of Example 2 is in a composition of a mixture of the starting materials, nickel selenide and silver sulfide. The preparation of the disc is similar to that of Example 1. The potential between the selective electrode and a saturated calomel electrode in an aqueous solution of pure chromium(III) nitrate is measured by the same procedure described in Example 1.

TABLE 2

| Activity of chromium(III) ions, M | Potential mV | | | | |
|---|---|---|---|---|---|
| | 1:99* | 5:95* | 25:75* | 50:50* | 60:40* |
| $10^{-1}$ | −39 | −53 | −53 | −52 | −56 |
| $10^{-2}$ | −58 | −68 | −72 | −72 | −72 |
| $10^{-3}$ | −68 | −85 | −90 | −90 | −91 |
| $10^{-4}$ | −73 | −104 | −110 | −109 | −110 |
| $10^{-5}$ | −77 | −120 | −130 | −130 | −130 |
| $10^{-6}$ | −79 | −131 | −148 | −146 | −145 |

*Weight ratio of nickel selenide: silver sulfide

Example 3

The device for measuring the activity of chromium(III) ions is prepared in a manner similar to that of Example 1. A disc of Example 3 is in a composition of a mixture of the starting materials, nickel telluride and silver selenide. The preparation of the disc is similar to that of Example 1. The potential between the selective electrode and a saturated calomel electrode in an aqueous solution of pure chromium(III) nitrate is measured by the same procedure described in Example 1.

TABLE 3

| Activity of chromium(III) ions, M | Potential mV | | | | |
|---|---|---|---|---|---|
| | 1:99* | 5:95* | 25:75* | 50:50* | 60:40* |
| $10^{-1}$ | −36 | −31 | −35 | −42 | −26 |
| $10^{-2}$ | −42 | −45 | −51 | −58 | −37 |
| $10^{-3}$ | −49 | −59 | −69 | −76 | −48 |
| $10^{-4}$ | −52 | −77 | −88 | −96 | −53 |
| $10^{-5}$ | −52 | −93 | −105 | −114 | −55 |
| $10^{-6}$ | −53 | −101 | −111 | −124 | −56 |

*Weight ratio of nickel telluride: silver selenide

Example 4

The device for measuring the activity of chromium(III) ions is prepared in a manner similar to that of Example 1. A disc of Example 4 is in a composition of a mixture of the starting materials, nickel selenide and silver selenide. The preparation of the disc is similar to that of Example 1. The potential between the selective electrode and a saturated calomel electrode in an aqueous solution of pure chromium(III) nitrate is measured by the same procedure described in Example 1.

TABLE 4

| Activity of chromium(III) ions, M | Potential mV | | | | |
|---|---|---|---|---|---|
| | 1:99* | 5:95* | 25:75* | 50:50 | 60:40 |
| $10^{-1}$ | −45 | −51 | −52 | −55 | −56 |
| $10^{-2}$ | −55 | −68 | −68 | −71 | −68 |
| $10^{-3}$ | −66 | −82 | −86 | −88 | −86 |
| $10^{-4}$ | −70 | −106 | −105 | −108 | −104 |
| $10^{-5}$ | −72 | −125 | −123 | −125 | −122 |
| $10^{-6}$ | −72 | −140 | −138 | −136 | −133 |

*Weight ratio of nickel selenide: silver selenide

Example 5

A device for measuring the activity of chromium(III) ions is prepared in a manner similar to that of Example 1. A disc of Example 5 includes 25 wt percent of nickel telluride, 35 wt percent of silver selenide and 40 wt% of silver sulfide. The preparation of the disc is similar to that of Example 1. The potential between the selective electrode and a saturated calomel electrode in an aqueous solution of pure chromium(III) nitrate is measured with the same procedure described in Example 1. The device measures the activity of chromium(III) ions with a high sensitivity as shown in Table 6.

TABLE 5

| Activity of chromium(III) ions, M | Potential mV |
|---|---|
| $10^{-1}$ | −25 |
| $10^{-2}$ | −40 |
| $10^{-3}$ | −60 |
| $10^{-4}$ | −80 |
| $10^{-5}$ | −97 |
| $10^{-6}$ | −114 |

Example 6

A device for measuring the activity of chromium(III) ions is prepared in a manner similar to that of Example 1. A disc of Example 6 includes 15 wt percent of nickel sulfide, 15 percent of nickel telluride, 50 percent of silver sulfide and 20 percent of silver selenide as the starting materials. The preparation of the disc is similar to that of Example 1. The potential between the selective electrode and a saturated calomel electrode in an aqueous solution of chromium(III) nitrate is measured with the same procedure described in Example 1. The device measures the activity of chromium(III) ions with a high sensitivity as shown in Table 7.

TABLE 6

| Activity of chromium(III) ions, M | Potential mV |
| --- | --- |
| $10^{-1}$ | $-52$ |
| $10^{-2}$ | $-70$ |
| $10^{-3}$ | $-90$ |
| $10^{-4}$ | $-109$ |
| $10^{-5}$ | $-128$ |
| $10^{-6}$ | $-144$ |

Example 7

A device for measuring the activity of chromium(III) ions is prepared in a manner similar to that of Example 1. A disc of Example 7 includes 10 wt percent of nickel selenide, 15 percent of nickel telluride and 75 percent of silver sulfide as the starting materials. The preparation of the disc is similar to that of Example 1. The potential between the selective electrode and a saturated calomel electrode in an aqueous solution of chromium-(III) nitrate is measured with the same procedure described in Example 1.

TABLE 7

| Activity of chromium(III) ions, M | Potential mV |
| --- | --- |
| $10^{-1}$ | $-53$ |
| $10^{-2}$ | $-71$ |
| $10^{-3}$ | $-91$ |
| $10^{-4}$ | $-111$ |
| $10^{-5}$ | $-130$ |
| $10^{-6}$ | $-147$ |

What is claimed is:

1. A method for measuring the activity of chromium (III) ions in a solution, comprising immersing a selective electrode and a reference electrode in a solution consisting essentially of chromium ions, said selective electrode comprising a disc in a batch composition which comprises a combination of nickel chalcogenide and at least one member selected from the group consisting of silver telluride and silver selenide and measuring the potential difference between the electrodes.

2. A method as defined in claim 1, wherein said batch composition comprises a combination of 5–60 wt. percent of nickel chalcogenide and 40–95 wt. percent of at least one member selected from the group consisting of silver telluride and silver selenide.

3. A method for measuring the activity of chromium (III) ions in a solution, comprising immersing a selective electrode and a reference electrode in a solution consisting essentially of chromium ions, said selective electrode comprising a disc made from a batch composition which comprises a combination of silver chalcogenide and at least one member selected from the group consisting of nickel telluride and nickel selenide and measuring the potential difference between the electrodes.

4. A method as defined in claim 3, wherein said batch composition comprises a combination of 40–95 wt. percent of silver sulfide and 5–60 wt percent of at least one member selected from the group consisting of nickel telluride and nickel selenide.

5. A method as defined in claim 3, wherein said silver chalcogenide includes silver sulfide and at least one member selected from the group consisting of silver telluride and silver selenide, the weight ratio of said silver sulfide to said one member being in a range from 1 to 10.

6. A method as claimed in claim 3, wherein said batch composition comprises 70–90 wt. percent of silver sulfide and 10–30 wt. percent of nickel telluride.

* * * * *